United States Patent [19]

Poran

[11] 3,760,670
[45] Sept. 25, 1973

[54] ROTARY SHEAR
[75] Inventor: Michael Poran, New York, N.Y.
[73] Assignee: Danieli & C.S.p.A., Buttrio, Italy
[22] Filed: Sept. 10, 1971
[21] Appl. No.: 179,492

[30] Foreign Application Priority Data
June 28, 1971 Germany................ P 21 32 124.4

[52] U.S. Cl............ 83/102, 83/165, 83/288, 83/306, 83/444, 83/496
[51] Int. Cl............ B23d 19/04, B26d 3/16
[58] Field of Search............ 83/496, 497, 500, 83/503, 102, 105, 157, 165, 288, 343, 344, 438, 444, 306

[56] References Cited
UNITED STATES PATENTS
3,491,640   1/1970   Poran.................. 83/497 X
2,223,497   12/1940  Purser et al.......... 83/500 X
2,701,016   2/1955   Bedson................ 83/105
3,258,951   7/1966   Kinnicutt, Jr. et al... 83/105 X
2,881,835   4/1959   Morgan................ 83/343 X
2,160,999   6/1939   Yoder................. 83/105

Primary Examiner—Andrew R. Juhasz
Assistant Examiner—James F. Coan
Attorney—Craig and Antonelli

[57] ABSTRACT

A pair of discs mounted on mutually inclined shafts each have a pair of concentric cutting edges on opposed faces so that the cutting edges closely oppose each other at one peripheral location to form a cutting zone. Stock to be cut is fed generally tangentially into the area of this zone, the path of travel of the stock being movable radially outwardly to cause the stock to be moved through the cutting zone and hence cut by the cutting edges.

10 Claims, 6 Drawing Figures

INVENTOR
MICHAEL PORAN

BY Craig, Antonelli & Hill

ATTORNEYS

INVENTOR
MICHAEL PORAN
BY Craig, Antonelli & Hill
ATTORNEYS

ROTARY SHEAR

This invention relates to a rotary shear.

The object of this invention is to provide a rotary shear having a mode of operation that is well adapted to the cutting of rolled stock or any other continuously supplied elongated material, such operation being particularly adapted to high speeds.

BRIEF SUMMARY OF THE INVENTION

To this end the invention comprises a pair of discs each having a circumferentially extending cutting edge, and preferably two concentric such cutting edges, formed on one of its faces. These discs are mounted on shafts that are inclined to each other so that the cutting edges are closely opposed to each other at one peripheral location to define a cutting zone, while being apart from each other at other peripheral locations. A directing element is provided for feeding the stock to be cut generally tangentially into the general area of this cutting zone. This element is movable so as to be able to cause the path of travel of the stock to be moved radially outwardly through the cutting zone. In the preferred embodiment this movement takes place from a first location that is radially inward of the inner pair of the concentric cutting edges to a final location that is radially outward of the outer pair of such cutting edges. As each cutting edge is traversed in the radial direction, a cut is made. As a result, different parts of the stock can be caused to travel to respective receiving devices located at the radially inward and outward locations, and, in the preferred embodiment a third part will travel through the cutting zone itself to a third receiving device.

If desired, the apparatus can be expanded by the use of more than two concentric cutting edges, with consequent division of the cutting zone into further portions by those cutting edge or edges that will be located intermediate the radially innermost and outermost ones.

BRIEF DESCRIPTION OF DRAWINGS

Further details of the shear according to the invention will become apparent from the following detailed description of preferred embdiments with reference to the drawings, in which.

DETAILED DESCRIPTION OF EMBODIMENTS

Figure 1:
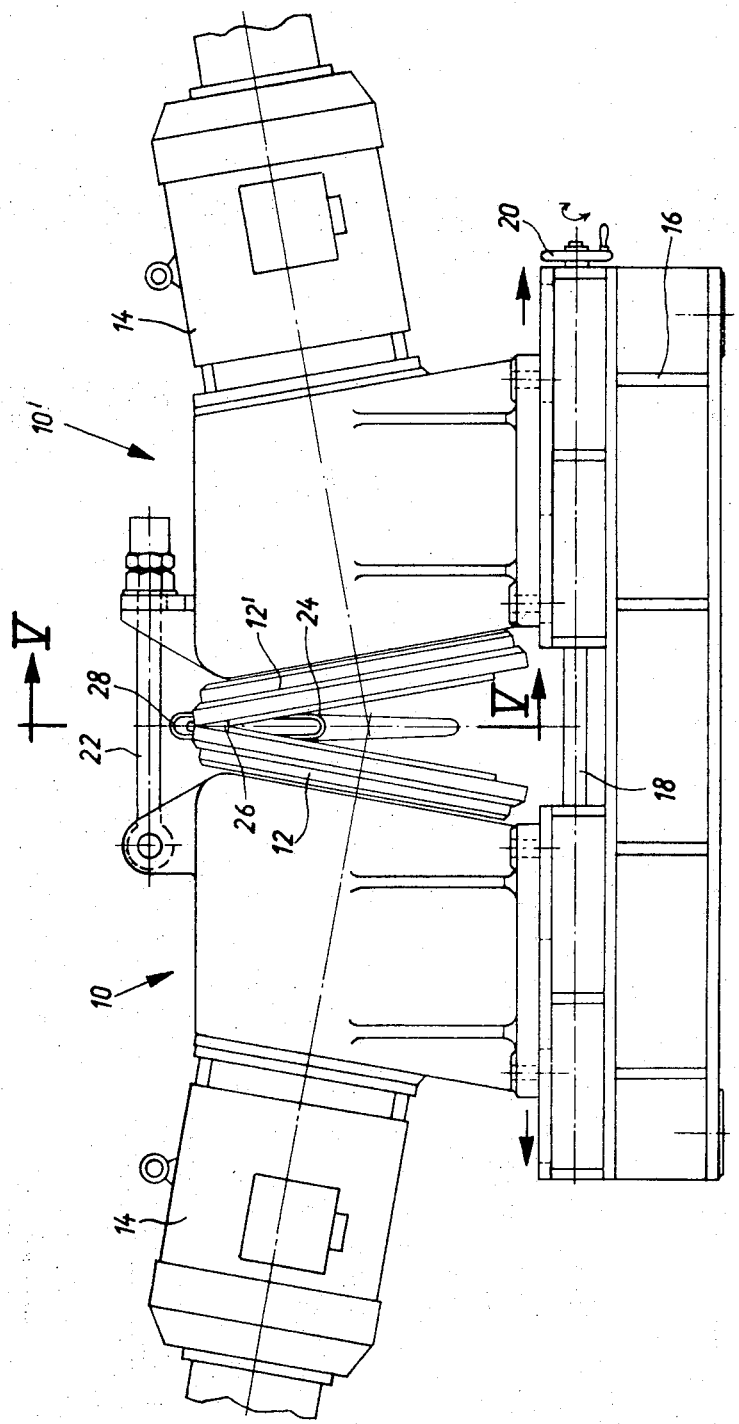
FIG. 1 is a front view of a shear according to the invention as viewed in the direction of movement of the rolled stock.

The shear shown in FIG. 1 generally consists of two identical units 10, 10' disposed symmetrically to each other. The units 10, 10' carry rotatably mounted discs 12, 12' on the sides of the units facing each other, each disc being driven by a motor 14 attached to the other side of the respective unit by a shaft that extends through the unit and may include a coupling. The shafts are inclined to each other. The two units 10, 10' are mounted on a base 16 and can be moved towards and away from each other in the horizontal direction by a threaded spindle 18 by actuating a handwheel 20. The tops of the units 10 and 10' are detachably connected by means of a tension bolt 22. Also seen in FIG. 1 in the center and behind the two units 10, 10' are catching and guiding elements 24, 26 and 28.

Figure 2:
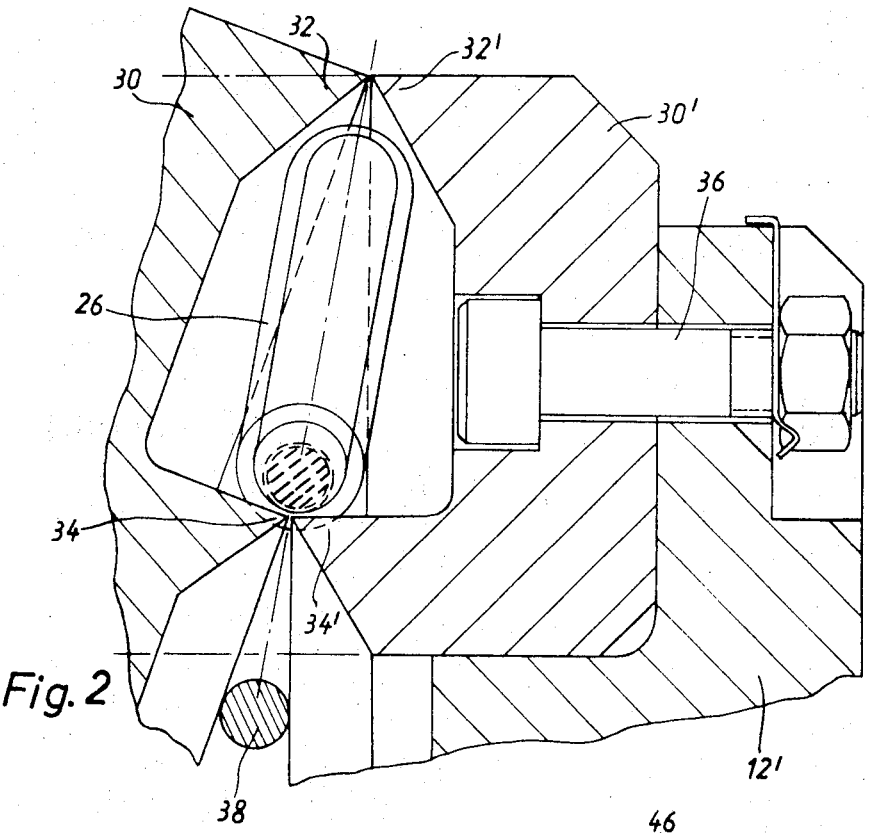
FIG. 2 is an enlarged sectional view of a cutting ring fixed to a disc and comprising two concentric cutting edges.

In the enlarged sectional view of FIG. 2, the rim of the disc 12' is shown with a cutting ring 30' fixed thereto, which, in the embodiment shown, is provided with two concentric cutting edges 32' and 34'. The ring 30' is held in a recess in the disc 12' by means of bolts 36. The two corresponding cutting edges 32 and 34 of the opposed cutting ring 30 are also seen. The central catching and guiding element 26 extends into the cutting zone between the pairs of cutting edges 32, 32' and 34, 34'. The rolled stock 38 which, in the embodiment shown, is round, is shown immediately prior to the first cutting process in solid lines and after the first cutting process in broken lines.

Figure 3:
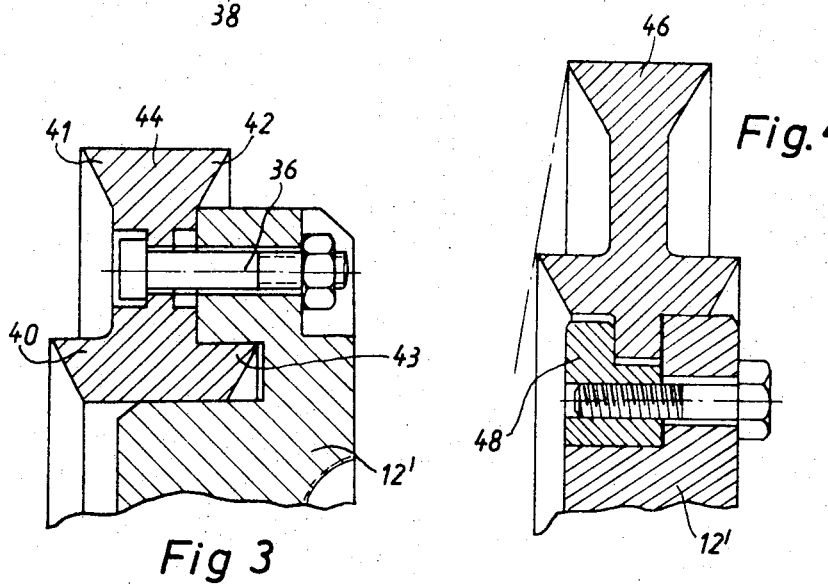
FIGS. 3 and 4 are views similar to FIG. 2 showing further embodiments of a cutting ring with two concentric cutting edges.

Another embodiment of cutting ring is shown in FIG. 3. According to FIG. 3, the cutting ring 44 is provided with a total of four cutting edges 40 to 43, the cutting edges 40 and 41 being disposed in the same manner as the cutting edges 34' and 32' in the embodiment of FIG. 2. The cutting edges 42 and 43 are disposed symmetrically to the cutting edges 41 and 40, respectively. In FIG. 3, the cutting edges 40 and 41 are shown in the operative positions; by mounting the cutting ring 44 in its inverted position, the other two cutting edges 42 and 43 can be brought into operative position. The life of the cutting ring 44 can thus be doubled. Similarly to FIG. 2, the cutting ring 44 of FIG. 3 is fixed to the disc 12' by means of bolts 36.

Figure 4:
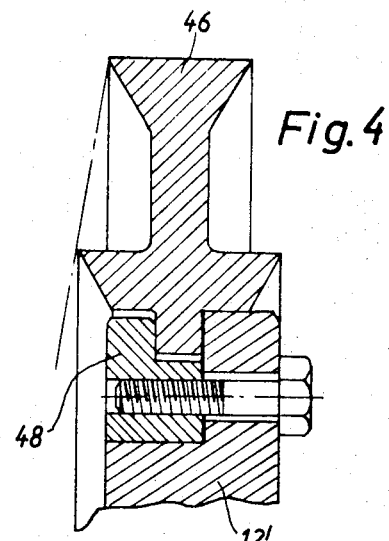

In the modified embodiment of FIG. 4, the cutting ring 46 is provided similarly to the cutting ring 44 with four cutting edges symmetrical in pairs, but without bores for the fastening bolts. Instead the cutting ring 46 is fastened to the disc 12' by a clamping ring 48 and bolts.

Figure 5:
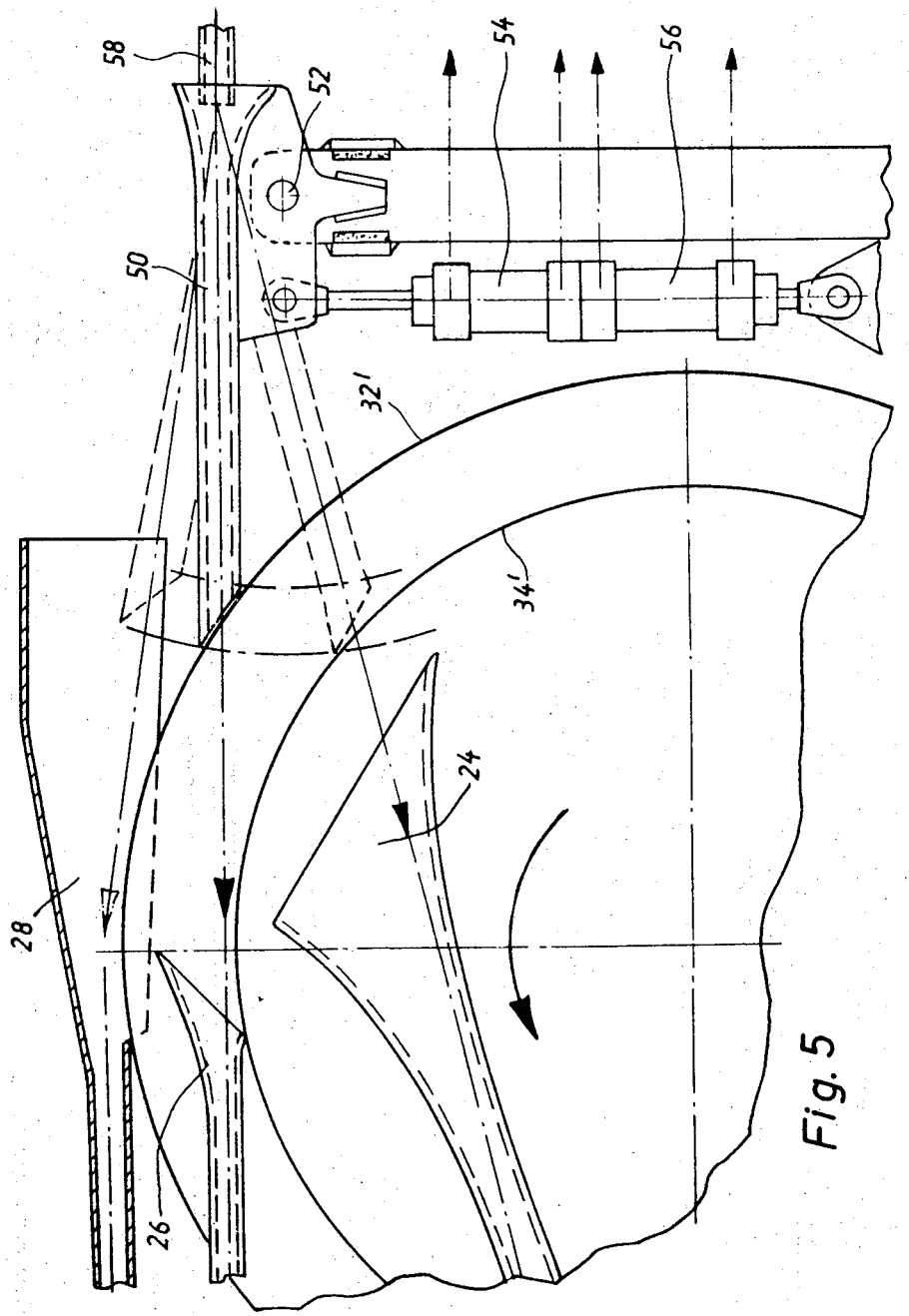
FIG. 5 is a section through the device of FIG. 1, taken along the line V—V.

FIG. 5 shows the disposition of a directing element 50 and of the three catching and guiding elements 24, 26 and 28 relative to the cutting edges 32', 34' which are here shown only diagrammatically. The directing element 50 is mounted at 52 so as to be orientable about a horizontal axis. Two actuating air cylinders 54, 56 connected in series serve to move the directing element 50 to three different operative positions by tilting the element about the point 52. At its rear end the directing element 50 is widened into a funnel shape surrounding the end of a feed tube 58 through which the rolled stock is supplied from the rolling stand. Similarly to the rear end of the directing element 50, the inlet openings of the catching and guiding elements 24, 26 and 28 are widened into funnel shapes and preferably have flattened cross-sectional shapes as can be seen in FIGS. 1 and 2. As will be seen the directing element 50 is adapted to feed the stock generally tangentially into the general area of the cutting zone defined by the peripheral portions of the cutting edges that are closely opposed to each other.

In the operation of the shear shown in FIGS. 1 to 5, the tip of the rolled stock moves through the feed tube 58 into the directing element 50 which is assumed to be in its lower position shown in broken lines. As seen in FIG. 2, the stock 38 thus moves between the two discs 12, 12' before they come together and below the cutting zone formed between the radially inner cutting edges 34, 34'. Hence it remains uncut and is received by the lowermost catching and guiding element 24 seen in FIGS. 1 and 5.

When a cutting action is to be performed, the directing element 50 is moved to the middle operative position shown in solid lines by admitting air to one of the two cylinders 54 or 56. The stock 38 is thus fed through the cutting zone of the inner cutting edges 34, 34' so that it is seized and pulled through by these cutting edges into the zone between the two pairs of cutting edges 34, 34' and 32, 32'. While thus being moved from one position to the other the stock is cut by the edges 34, 34', and the new tip of the stock 38 produced by this cutting is positively inserted into the middle catching and guiding element 26. The stock is shown in this position in FIG. 2 in broken lines.

The stock continues to travel along the thus chosen path, i.e. into the element 26, without further cutting, until the next cutting command is given. The other air cylinder is then actuated, in addition to the first cylinder which is still extended, so that the directing element 50 is moved to its third operative position, namely the upper position shown in broken lines in FIG. 5. During this reorientation the cutting takes place at the outer cutting edges 32, 32', in the same way as the first cutting took place at the inner cutting edges 34 and 34'. After this second cutting the stock continues to travel into the third catching and guiding element 28, without further cutting taking place.

Thus the directing element 50 is movable to cause the path of travel of the stock to be moved radially outwardly through the cutting zone to effect cutting of the stock.

According to FIG. 5, there are only two concentric cutting edges 32', 34'. With more than two concentric cutting edges and the correspondingly increased operative positions of the directing element 50, the catching and guiding element 28 would also be located between two pairs of cutting edges and would be formed similarly to the element 26 of FIG. 5.

This shear, comprising only two discs each with two cutting edges as shown in FIGS. 1 to 5, is suited for instance to be used as a cropping shear whereby the front crop end is moved into the catching element 24 and the rear crop element is moved into the catching element 28. The two elements 24 and 28 may each lead to a scrap bucket. The useful length of the rolled stock is fed into the middle catching element 26 and proceeds from there, for instance, to a reel, a cooling bed, a further rolling stand, or some other processing device.

Figure 6:
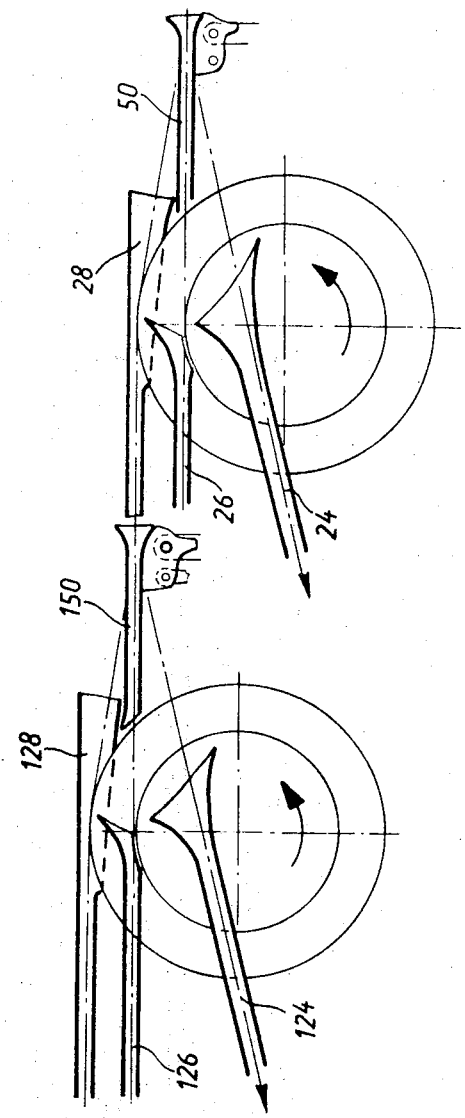
FIG. 6 is a view similar to FIG. 5 showing two pairs of discs disposed one behind the other.

According to FIG. 6, two pairs of discs are disposed serially one behind the other, which pairs may each be identical with the pair of discs according to FIGS. 1 to 5, such discs each comprising two cutting edges. Directing elements 50 and 150, respectively, and three catching and guiding elements 24, 26, 28 and 124, 126 and 128, respectively, are associated with the respective pairs of discs. Actuation of the two directing elements 50 and 150 can be performed so that both are at first in their lower operative position. The front crop end is then moved into the catching element 24. After re-orienting the directing element 50 to its middle position, a first section of the useful length of the rolled stock is fed into the catching element 26. With the directing element 50 in its upper position, a second section of the useful length is fed into the upper catching element 28 and through the rear directing element 150 into the catching element 124. The directing element 150 is then moved to its middle position, so that the third (and in this case the last) section of the useful length of the stock is fed into the catching element 126. Finally, the rear crop end is fed through the element 150 with the latter in its third position and hence into the catching element 128 and through this to the scrap bucket. The three catching elements 26, 124 and 126 into which the three useful sections are moved may lead to further processing devices as described above.

The arrangement of the directing element 150 at the outlet of the element 28 as shown in FIG. 6 is only an example. Alternatively, the element 150 could receive stock from one of the catching and guiding elements 26 or 24, the actuation program for the directing elements 50, 150 then being changed accordingly.

The above mentioned movability of the two units 10, 10' on the base 16 enables fine adjustment of the space between the cutting edges, as well as withdrawal of the units away from each other for maintenance. Instead of the illustrated sliding motion, the two units could be tiltable with respect to each other for the same purposes.

The above shear has been described as particularly suited for cutting rolled stock moving at high speed; basically, however, the shear can be used for cutting any continuously supplied material.

I claim:
1. A rotary shear comprising
   a. a pair of discs each having at least two concentric circumferentially extending cutting edges on a face thereof,
   b. means mounting said discs in a generally face-to-face relationship for rotation about a pair of axes inclined to each other to locate said cutting edges closely opposed to each other at one peripheral location and apart from each other at other peripheral locations to form a cutting zone at said one peripheral location, and
   c. directing means for directing stock generally tangentially into the general area of said cutting zone, including means for moving said directing means to cause the path of travel of the stock to be moved radially outwardly through said cutting zone to effect cutting of the stock.

2. A shear according to claim 1, wherein each said disc includes a stepped ring on which said cutting edges are formed.

3. A shear according to claim 1, wherein said directing means has at least three positions, in a first of which the stock is directed to a first location that is radially inward of the inner pair of said concentric cutting edges, in a second of which the stock is directed to a second location in said cutting zone between said concentric cutting edges, and in a third of which the stock is directed to a third location that is radially outward of the outer pair of said concentric cutting edges.

4. A shear according to claim 3, including catching and guiding means for receiving the stock in each of said three locations.

5. The combination of a pair of shears each according to claim 4, said shears being arranged serially with a said catching and guiding element of the first shear feeding to the directing means of the second shear.

6. A shear according to claim 1, wherein each of said pair of discs is provided with two pair of concentric circumferentially extending cutting edges.

7. A shear according to claim 6, wherein each of said discs includes a stepped ring upon which said cutting edges are disposed.

8. A shear according to claim 7, further comprising means between said cutting edges on each disc, for securing said stepped ring to said discs.

9. A shear according to claim 6, wherein said stepped ring is provided on the inner surface thereof with a radially extending flange and means are provided for clamping said flange to said discs.

10. A shear according to claim 1, wherein the inner and outer cutting edges of one of said pair of discs cooperates with the inner and outer cutting edges, respectively, of the other of said pair of discs.

* * * * *